Patented Dec. 25, 1928.

1,696,539

UNITED STATES PATENT OFFICE.

DONALD B. BRADNER, OF GORDON HEIGHTS, DELAWARE.

PURIFICATION OF ORGANIC COMPOUNDS.

No Drawing.    Application filed June 25, 1925.   Serial No. 39,880.

(GRANTED UNDER THE ACT OF MARCH 3, 1883, AS AMENDED APRIL 30, 1928; 370 O. G. 757.)

This invention described herein may be manufactured and used by or for the Government for Government purposes, without the payment to me of any royalty thereon.

This invention relates to a process of purifying organic compounds and has specific application to the purification of diphenylaminechlorarsine.

Among the objects of this invention is to provide a process of purify diphenylaminechlorarsine and similar organic compounds which will yield a product of high and satisfactory purity for use as a toxic irritating agent. A further object of this invention is to carry out the purification of diphenylaminechlorarsine by a method which is cheap, efficient and reliable and wherein a readily available material, such as water, is employed for washing the molten diphenylaminechlorarsine. A still further object of this invention is to provide a process for freeing the diphenylaminechlorarsine of those impurities causing instability in mixtures of the diphenylaminechlorarsine with smokeless powder.

Other further and more specific objects of the invention will become readily apparent to persons skilled in the art from a consideration of the following description.

Diphenylaminechlorarsine

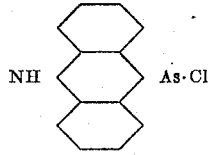

has been generally prepared by a reaction between diphenylamine and arsenic trichloride. The process was usually carried out by introducing diphenylamine and arsenic trichloride into a reaction kettle, bringing the mixture to a temperature of 190° C. and then further heating at 190–230° C. for five hours. The heat was then shut off and the reaction mass cooled. This crude diphenylaminechlorarsine contains among other impurities arsenic trichloride, hydrochloric acid and diphenylaminearsenious oxide. In order to purify this crude product, it was first cooled and then xylol was added, and the mass heated so that the resulting solution boiled for about thirty minutes. The product was drawn off into cans, crystallized, filtered, washed with alcohol, refiltered and removed to a vacuum chamber where it was dried. This product, although recrystallized from an organic solvent and then washed with an organic liquid, has been found lacking in purity and would not form stable mixtures when added to smokeless powder. Heating this product under vacuum did not give it the desired stability.

According to my invention, instead of charging the raw materials together, arsenic trichloride (in about 10% excess) is added gradually to the diphenylamine through a temperature range of 160–190° C. The mass is then further heated and maintained between 190° C. and 250° C. for about five hours. After this reaction is complete, practically all of the excess arsenic trichloride is removed by by-passing the condensed liquid in the refluxing tower and the charge is ready to be blown. A vat is filled with water and stirred by air agitation. The charge consisting of the reaction product between arsenic trichloride and diphenylamine is then blown into the vat, the wash-water is drawn off and the product washed about three times, using a total of about 30 pounds of water per pound of diphenylaminechlorarsine. This wash-water removes any remaining arsenic trichloride and other impurities from the product which is deposited in the tanks. The product is centrifuged and dried in vacuum driers. The resulting product is practically free of acids or acid forming substances and may be mixed and stored with explosives such as smokeless powder with safety.

In carrying out this process, I dispense with the use of purifying agents other than water which renders my process preferable to that employing treatments with xylol and alcohol for the following reasons:

1. My process removes all impurities to such an extent that the product satisfies the requirements of purity from a toxicological standpoint. In this connection it should be remembered that too long an exposure to the water will cause some hydrolysis of the diphenylaminechlorarsine, but the diphenylaminechlorarsenious oxide so formed is itself a powerful irritant and is stable.

2. My process greatly increases the stability of the product for use with other substances, such as smokeless powder.

3. My process eliminates the use of solvent recovery apparatus, increases the production and yield and is safer and cheaper.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making diphenylaminechlorarsine, introducing crude, molten diphenylaminechlorarsine into water and agitating the mass until the diphenylaminechlorarsine has solidified.

2. In a process of making diphenylaminechlorarsine, effecting a reaction between diphenylamine and arsenic trichloride, introducing the resulting mass while in a molten condition into water and agitating the mass until the diphenylaminechlorarsine has solidified.

3. In a process of making diphenylaminechlorarsine, adding arsenic trichloride to diphenylamine at 160–190° C., heating the resulting mixture at a temperature of 190–250° C. until the reaction is complete and washing the resulting product with water.

DONALD B. BRADNER.